(12) United States Patent
Takaishi et al.

(10) Patent No.: US 9,206,889 B2
(45) Date of Patent: Dec. 8, 2015

(54) DRIVE FORCE DISTRIBUTING APPARATUS

(71) Applicant: NISSAN MOTOR CO., LTD., Yokohama-shi, Kanagawa (JP)

(72) Inventors: Tetsu Takaishi, Chigasaki (JP); Atsuhiro Mori, Fujisawa (JP); Shunichi Mitsuishi, Isehara (JP); Eigo Sakagami, Kawasaki (JP); Katsuyoshi Ogawa, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 380 days.

(21) Appl. No.: 13/938,646

(22) Filed: Jul. 10, 2013

(65) Prior Publication Data
US 2014/0031167 A1 Jan. 30, 2014

(30) Foreign Application Priority Data

Jul. 30, 2012 (JP) ................................. 2012-167929

(51) Int. Cl.
*F16H 13/10* (2006.01)
*F16H 13/14* (2006.01)

(52) U.S. Cl.
CPC ................ *F16H 13/10* (2013.01); *F16H 13/14* (2013.01)

(58) Field of Classification Search
CPC .................................. F16H 13/10; F16H 13/14
See application file for complete search history.

(56) References Cited

U.S. PATENT DOCUMENTS

| | | | | |
|---|---|---|---|---|
| 1,981,582 A * | 11/1934 | Colucci | ................... | F16H 13/14 475/182 |
| 2,466,964 A * | 4/1949 | Perruca | ................... | F16H 13/14 476/48 |
| 3,033,048 A * | 5/1962 | Perruca | ................... | F16H 13/14 476/48 |
| 3,380,312 A * | 4/1968 | Barske | ................... | F16H 13/02 476/61 |
| 3,388,607 A * | 6/1968 | Stober | ................... | F16H 13/14 464/44 |
| 3,411,370 A * | 11/1968 | Nasvytis | ................. | F16H 13/14 476/61 |
| 4,557,155 A * | 12/1985 | Kopatz | ................... | F16H 13/14 475/159 |
| 4,841,792 A * | 6/1989 | Williams | ................ | F16H 13/14 476/63 |
| 5,263,377 A * | 11/1993 | Kleber | ................... | F02B 63/00 476/15 |
| 5,931,759 A * | 8/1999 | Otaki | ....................... | B62M 6/40 475/183 |
| 7,118,512 B2 * | 10/2006 | Flugrad, Jr. | ............. | F16H 13/02 476/33 |
| 7,153,230 B2 * | 12/2006 | Ai | .......................... | F16H 13/14 475/166 |
| 7,264,567 B2 * | 9/2007 | Ai | .......................... | F16H 13/14 192/38 |
| 7,367,916 B2 * | 5/2008 | Wimmer | ................... | F01P 5/12 123/198 R |
| 7,575,535 B2 * | 8/2009 | Yamamoto | .............. | F16H 15/46 476/42 |

(Continued)

FOREIGN PATENT DOCUMENTS

JP 2011-011560 A 1/2011

*Primary Examiner* — David M Fenstermacher
(74) *Attorney, Agent, or Firm* — Drinker Biddle & Reath LLP

(57) ABSTRACT

A drive force distributing device includes first and second rollers rotatable jointly with main a drive wheel system and a subordinate drive wheel system, respectively. Control of the drive force distribution between the main drive wheels and the subordinate drive wheels is performed by adjusting an inter-roller pressing force. A structural body suppresses turning of one of the first and second rollers at a predetermined position. A reference position setting mechanism turns either one of the first and second rollers to turn in one direction, detects a position at which the turn is suppressed by the structural body, and sets a reference position based on the detected position. A turning amount of one of the first and second rollers is detected with respect to the reference position set by the reference position setting mechanism and the control of drive force distributing is performed based on the detected turning amount.

8 Claims, 7 Drawing Sheets

(56) References Cited

U.S. PATENT DOCUMENTS

| | | | |
|---|---|---|---|
| 8,075,444 B2* | 12/2011 | Yamamoto | F16H 13/14 476/61 |
| 8,147,369 B2* | 4/2012 | Marumoto | F16H 13/06 399/167 |
| 8,683,885 B2* | 4/2014 | Yamamoto | F16H 13/14 476/59 |
| 8,903,613 B2* | 12/2014 | Mori | B60K 23/08 701/51 |
| 2012/0100955 A1 | 4/2012 | Sakagami et al. | |

* cited by examiner

DRIVE FORCE DISTRIBUTING APPARATUS

CROSS-REFERENCE TO RELATED APPLICATIONS

This application claims priority under 35 U.S.C. §119 to Japanese Patent Application No. 2012-167929 filed Jul. 30, 2012. The entire disclosure of Japanese Patent Application No. 2012-167929 is incorporated herein by reference.

BACKGROUND

1. Field

The present invention generally relates to a vehicle drive force distributing apparatus suitable for a transfer case of a four-wheel drive vehicle.

2. Related Art

A drive force distributing apparatus including a first roller mechanically coupled to a transmission system of a pair of main drive wheels and a second roller mechanically coupled to a drive system of a pair of sub-drive or subordinate wheels is disclosed. The system becomes engaged when first and second rollers are mechanically pressed so as to make contact with each other at their outer peripheral surfaces. As such, a mechanical torque can be distributed between the main drive wheels and subordinate drive wheels such that a percentage allocated to the main drive wheels vs. the percentage allocated to the subordinate drive wheels is continuously selectable. Accordingly, a torque transmission capacity between the rollers can be controlled by adjusting a radial pressing force between the first roller and the second roller so as to adjust the distribution of the drive force between the main drive wheels and the sub-drive wheels.

An example mechanism for performing this drive force distribution control is disclosed in the Japanese Laid-open Patent Publication No. 2011-11560 (and corresponding U.S. Patent Application Publication No. 2012/0100955 A1). In this example a second roller is supported in an eccentric shaft portion of a crankshaft and the rotation axis of the second roller revolves or turns about the eccentric axis by operating the crankshaft to rotate. By displacing the position of the rotation axis of the second roller (by an angular amount along a curve) the second roller becomes displaced toward the first roller. Thus, the radial pressing force between the first roller and the second roller may be controlled. To perform this control, it is necessary to detect the rotation angle of the crankshaft. The rotation angle of the crankshaft corresponds to the angular position of the eccentric axis of the second roller and is obtainable as an amount of angular movement with respect to a reference position.

The reference point is set as follows. The crankshaft is turned and the axis of the second roller is therefore displaced toward the first roller. Meanwhile the first roller is turned to one direction at a constant torque while the second roller is turned in the reverse direction at the same magnitude of constant torque. As the first and second rollers are pressed with increasing force toward one another (by turning the crank shaft) eventually the second roller stops turning due to the torque imposed by the first roller. The angular position of the crankshaft at which the second roller stops it taken as a reference point. This reference point corresponds to the situation in which the two rollers are pressed together with sufficient force so as to prevent slippage between the rollers and thus represents the point at which drive force distribution system is beginning to be engaged for transferring torque. By increasing the crankshaft rotation angle beyond this reference point allows torque to be increasingly diverted from the main drive wheels to the sub-drive wheels.

The above described system, however, suffers from the drawback that, generally, a time delay is associated with the detection of the rotation angle of the crankshaft.

SUMMARY OF THE INVENTION

The disclosed embodiments overcome the above problems and provide a drive force distributing apparatus that can more quickly detect the rotation angle of the crankshaft.

According to an embodiment, a drive force distributing device includes first and second rollers rotatable jointly with a main drive wheel system and a subordinate drive wheel system, respectively. Control of the drive force distribution between the main drive wheels and the subordinate drive wheels is performed by adjusting an inter-roller pressing force. A structural body suppresses turning of one of the first and second rollers at a predetermined position. A reference position setting mechanism turns either one of the first and second rollers to turn in one direction, detects a position at which the turn is suppressed by the structural body, and sets a reference position based on the detected position. A turning amount of one of the first and second rollers is detected with respect to the reference position set by the reference position setting mechanism and the control of drive force distributing is performed based on the detected turning amount.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 4A illustrates an embodiment in which the first roller and the second roller are separated from each other at crankshaft rotation angle=0°. FIG. 4B illustrates an embodiment in which the first roller and the second roller are in contact state at crankshaft rotation angle=90°. FIG. 4C illustrates the contact state between the first roller and the second roller at crankshaft angle=180°.

Figure 1:
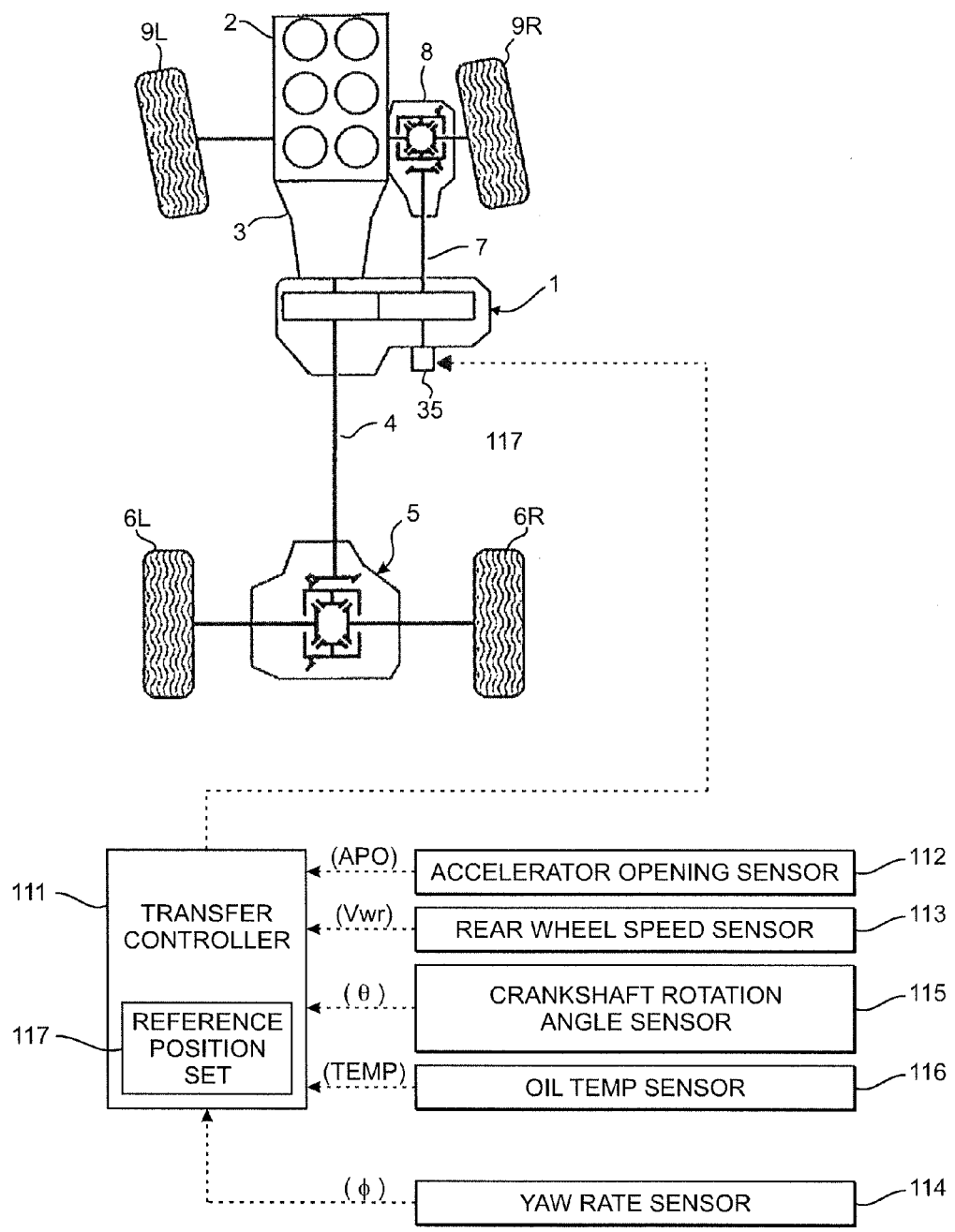
FIG. 1 is a schematic top down view of an example of a power train of a four-wheel drive vehicle equipped with a drive force distributing apparatus, according to a first embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

It is to be appreciated that any additional disclosure found in the Figures is meant to be exemplary and not limiting to any of the features shown in the Figures and described in the specification below.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

FIG. 1 is a schematic top down view of a power train of a four-wheel drive vehicle equipped with a drive force distributing apparatus 1 according to a first disclosed embodiment. The basic structure is as disclosed in U.S. Patent Application Publication No. 2011/0319223 A1, which is incorporated by reference herein in its entirety.

The four-wheel drive vehicle is based on a rear wheel drive configuration in which torque from an engine 2 is multiplied by a transmission 3 and is transferred through a rear propeller shaft 4 and a rear final drive unit 5 to left 6L and right 6R rear wheels. The vehicle can operate in a four-wheel drive manner by using the drive force distributing apparatus 1 to divert a portion of the torque being provided to the left 6L and right 6R rear wheels (main drive wheels) through a front propeller shaft 7 and a front final drive unit 8 to transmit torque to left 9L and right 9R front wheels (subordinate drive wheels).

The drive force distributing apparatus 1 thus determines a drive force distribution ratio between the left 6L and right 6R rear wheels (main drive wheels) and the left 9L and right 9R front wheels (subordinate drive wheels). In this embodiment, the drive force distributing apparatus 1 can be configured as shown in FIG. 2.

Figure 2:
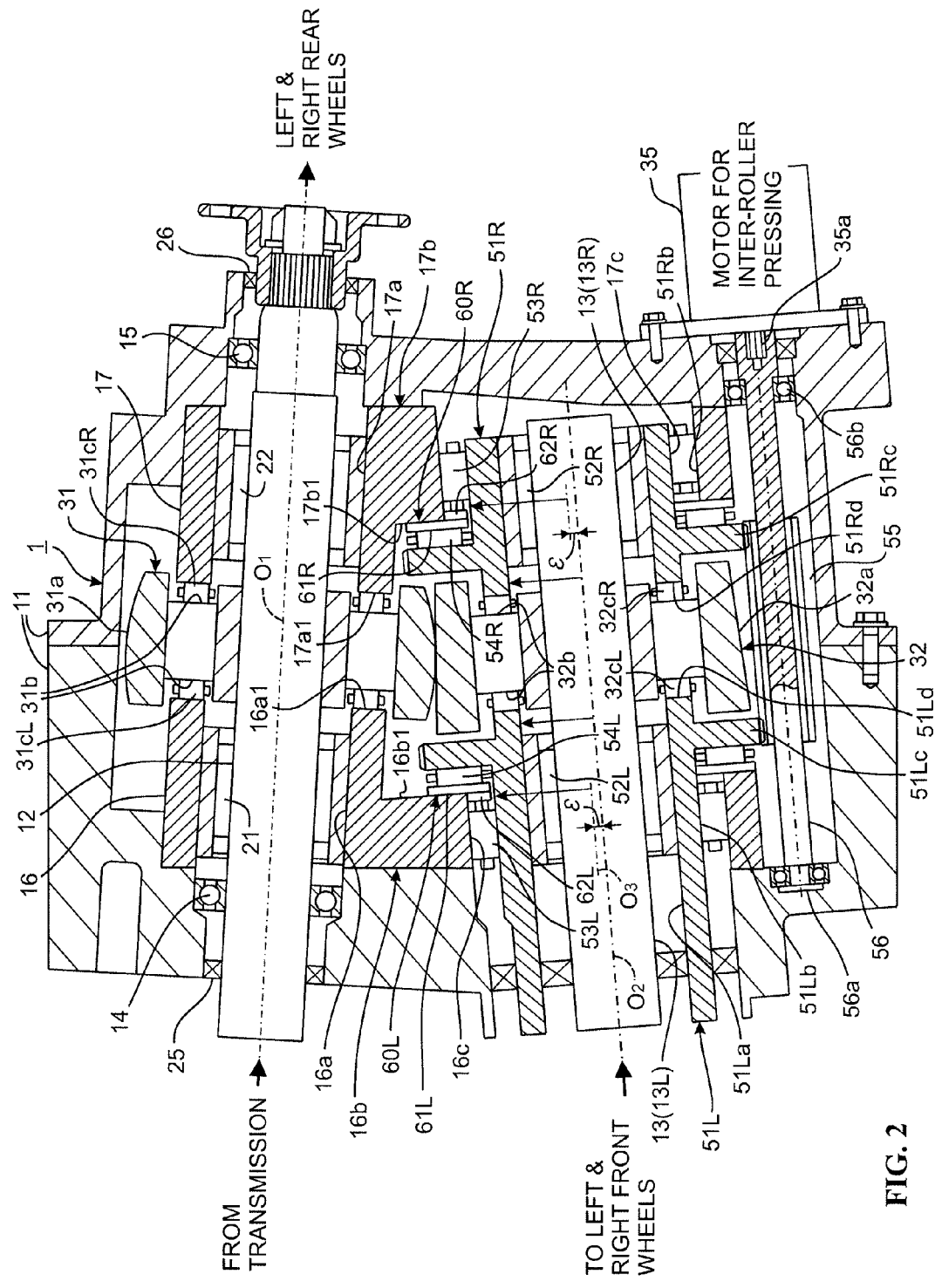
FIG. 2 is a schematic vertical cross-sectional side view of the drive force distributing apparatus shown in FIG. 1.

As shown in FIG. 2, the apparatus includes a housing 11. An input shaft 12 and an output shaft 13 are arranged to span across an inside of the housing 11 diagonally with respect to each other such that a rotational axis $O_1$ of the input shaft 12 and a rotational axis $O_2$ of the output shaft 13 intersect each other. The input shaft 12 is rotatably supported in the housing 11 on ball bearings 14 and 15 located at both ends of the input shaft 12. Furthermore, both ends of the input shaft 12 protrude from the housing 11 and are sealed in a liquid-tight fashion or a substantially liquid-tight fashion by seal rings 25 and 26. In this arrangement, one end of the input shaft 12 shown at the left side of FIG. 2 is coupled to an output shaft of the transmission 3 (see FIG. 1). Also, the other end of the input shaft 2 at the right side of FIG. 2 is coupled to the rear final drive unit 5 through the rear propeller shaft 4 (see FIG. 1)

A pair of bearing supports 16 and 17 are provided between the input shaft 12 and the output shaft 13 in positions near the ends of the input shaft 12 and the output shaft 13. The bearing supports 16 and 17 are fastened to axially opposite internal walls of the housing 11 with fastening bolts (not shown), at approximate middle portions of the bearing supports 16 and 17. Bearing support 16, 17, is provided with an input shaft through bore 16a, 17a, output shaft through bore 16c, 17c, for passing through the output shaft 13 and crankshaft 51L, 51R, and a vertical wall 16b, 17b, connecting between the input shaft through bore 16a, 17a, and output shaft through bore 16c, 17c, and is generally shaped in the axial direction front view. Roller bearings 21, 22, are arranged between the bearing supports 16, 17, and input shaft 12 for supporting the input shaft 12 freely or rotatably relative to bearing supports 16, 17, so that input shaft 12 is supported inside the housing 11 rotatably through the bearing supports 16, 17.

A first roller 31 is formed integrally and coaxially with the input shaft 12 in an axially intermediate position located between the bearing supports 16 and 17, that is, between the roller bearings 21 and 22. A second roller 32 is formed integrally and coaxially with the output shaft 13 in an axially intermediate position such that the second roller 32 can make frictional contact via working oil (lubricating oil) with the first roller 31 in a power transmittable way. The outer circumferential surfaces of the first roller 31 and the second roller 32 are conically tapered in accordance with the diagonal relationship of the input shaft 12 and the output shaft 13 such that the outer circumferential surfaces can line contact each other (i.e., make contact along a line) without or substantially without a gap between the surfaces.

The output shaft 13 is rotatably supported with respect to the bearings supports 16 and 17 at positions near both ends of the output shaft 13. Thus, the output shaft 13 is rotatably supported inside the housing 11 through the bearing supports 16 and 17. A support structure used to support the output shaft 13 rotatably with respect to the bearing supports 16 and 17 is realized by an eccentric support structure as will now be explained.

As shown in FIG. 2, a crankshaft 51L configured as a hollow outer shaft is moveably fitted between the output shaft 13 and the bearing support 16. Also, a crankshaft 51R configured as a hollow outer shaft is moveably fitted between the output shaft 13 and the bearing support 17. These crankshafts 51L, 51R are used as a roller turning drive members. The crankshaft 51L and the output shaft 13 protrude from the housing 11 as shown on the left side of FIG. 2. At the protruding portion, a seal ring 27 is installed between the housing 11 and the crankshaft 51L. Also, a seal ring 28 is installed between the crankshaft 51L and the output shaft 13. The seal rings 27 and 28 serve to seal the portions where the crankshaft 51L and the output shaft 13 protrude from the housing 11 in a liquid-tight or substantially liquid-tight fashion.

The left end of the output shaft 13 protruding from the housing 11 in FIG. 2 is coupled to the front wheels 9L and 9R through the front propeller shaft 7 (see FIG. 1) and the front final drive unit 8. A roller bearing 52L is arranged between a center hole or bore 51La (radius Ri) of the crankshaft 51L and a corresponding end portion of the output shaft 13. Also, a roller bearing 52R is arranged between a center hole 51Ra (radius Ri) of the crankshaft 51 R and a corresponding end portion of the output shaft 13. Thus, the output shaft 13 is supported such that the output shaft 13 can rotate freely about the center axis $O_2$ inside the center holes 51La and 51Ra of the crankshaft 51L and 51R

Figure 3:
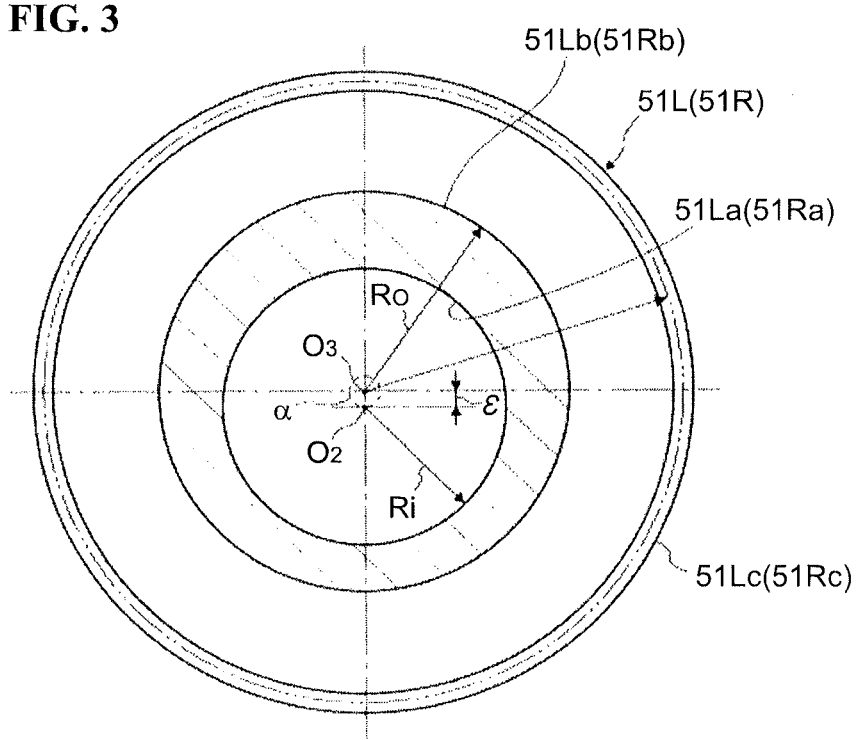
FIG. 3 is a schematic vertical cross-sectional front view of a crankshaft used in the drive force distributing apparatus, according to an embodiment.

As shown in FIG. 3, the crankshaft 51L has an outer circumferential portion 51Lb (center shaft axis O3, radius Ro) that is eccentric with respect to the center hole 51La. Also, the crankshaft 51R has an outer circumferential portion 51Rb (center shaft axis O3, radius Ro) that is eccentric with respect to the center hole 51Ra. The eccentric outer circumferential portions 51Lb and 51Rb are offset from the center axis (rotational axis) $O_2$ of the center holes 51La and 51Ra by an eccentric amount E. The eccentric outer circumferential portion 51Lb of the crankshaft 51L is rotatably supported inside the corresponding bearing support 16 through a roller bearing 53L. The eccentric outer circumferential portion 51Rb of the crankshaft 51R is rotatably supported inside the corresponding bearing support 17 through a roller bearing 53R. In addition, the roller side contact portions 51Ld, 51Rd, of crankshafts 51L, 51R, are freely and rotatably supported on thrust bearings 32cL, 32cR. Further, thrust bearings 54L, 54R, are provided axially outside with respect to thrust bearings 32cL, 32cR. These thrust bearings 54L, 54R, contact spacers 60L, 60R rotatably and also contact ring gears 51Lc, 51Rc rotatably to thereby support crankshaft 51L and 51R rotatably fee.

Crankshafts 51L, 51R, are respectively formed integrally with ring gears 51Lc, 51Rc, which face each other and provided at respective end of the associated crankshaft. These ring gears 51Lc, 51Rc, are each meshed with a common crankshaft drive pinion 55 such that the crankshaft pinion is coupled to pinion shaft 56. The ring gears 51Lc and 51Rc are meshed with the crankshaft drive pinion 55 such that the eccentric outer circumferential portions 51Lb and 51Rb of the crankshafts 51L and 51R are aligned with each other in a circumferential direction. That is, the rotational positions of the eccentric outer circumferential portions 51Lb and 51Rb are in phase with each other.

The pinion shaft 56 is rotatably supported with respect to the housing 11 by bearings 56a and 56b arranged at both ends of the pinion shaft 56. A right end of the pinion shaft 56 passes through the housing 11 as shown on the right-hand side of FIG. 2. An exposed end portion of the pinion shaft 56 is operably coupled to an output shaft 35a of an inter-roller radial pressing force control motor 35 through serration coupling and the like. Therefore, rotational position control can be executed with respect to the crankshafts 51L and 51R by driving the crankshafts 51L and 51R with the inter-roller radial pressing force control motor 35 through the pinions 55 and the ring gears 51Lc and 51Rc. When this occurs, the output shaft 13 and the rotation axis $O_2$ of the second roller 32 turn about the center axis (rotational axis) $O_3$ so as to revolve along a circular path α indicated with a broken line in FIG. 3.

In the present embodiment a reference position for detection of a rotation angle of crankshaft 51L, 51R is set as described below, and the crankshaft rotation angle θ at that reference position is set=0°, while the rotational amount from the reference position is defined as a crankshaft rotation angle θ. Until the setting process for the reference point is described (below), for convenience of explanation, the reference rotation angle of crankshaft is assumed to be top dead center for further description.

Figure 4:
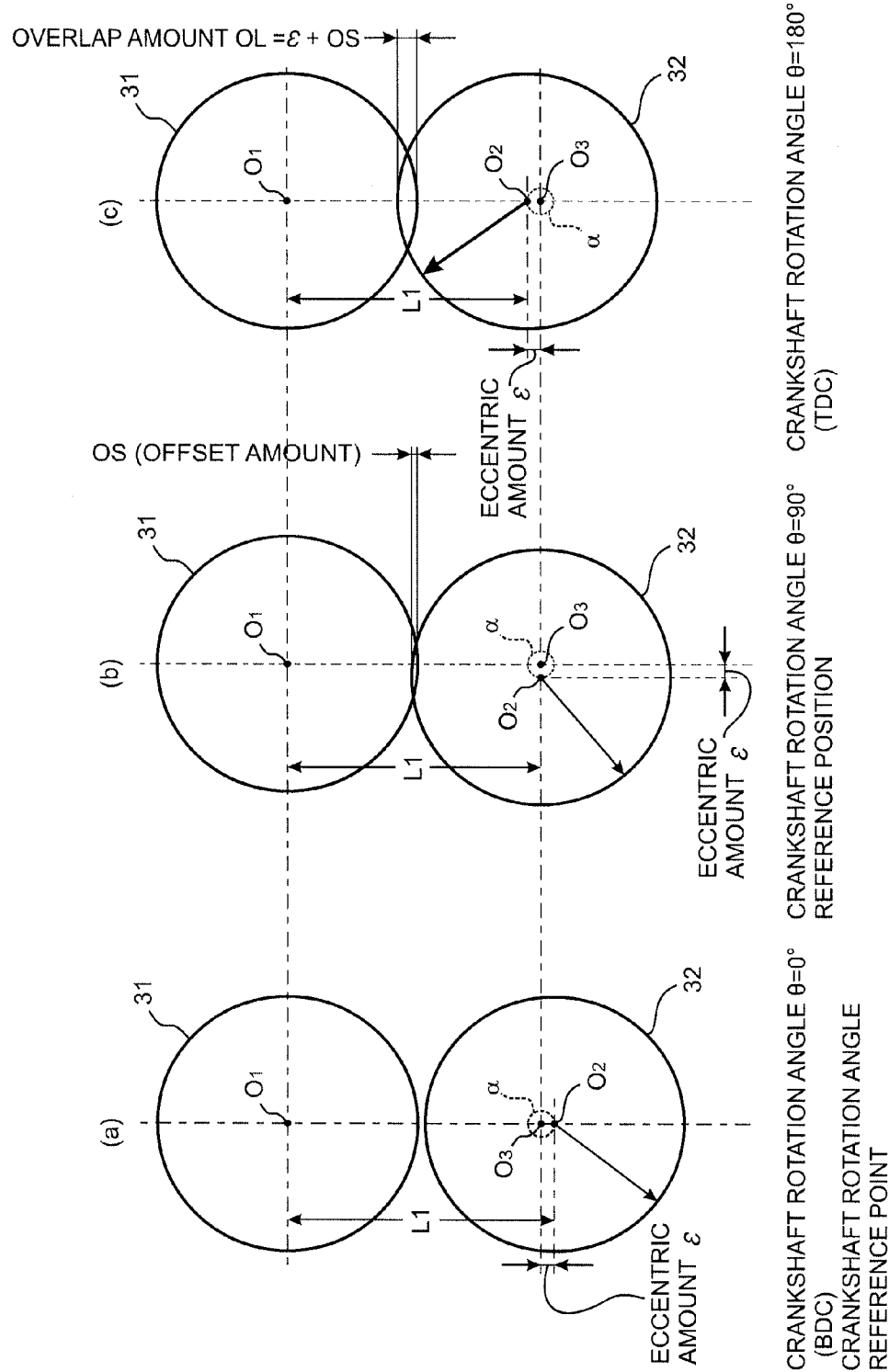
FIGS. 4A through 4C are a series of views illustrating embodiments of the drive force distributing apparatus of FIG. 2.

As described below, by shifting the rotation shaft axis O2 (second roller 32) along a circular path α as shown in FIG. 3, the second roller 32 approaches the first roller 31 in the radial direction as shown in FIGS. 4A to 4C. Thus, by increasing the rotation angle θ of crankshafts 51L, 51R, the roller center distance L1 between the first roller 31 and the second roller 32 may be decreased to be less than the sum of the radius of the first roller 31 and the radius of the second roller 32. Thus, the radial pressing force of the second roller 32 on the first roller 31 (inter-roller transmission torque capacity; traction transmission capacity) increases. Therefore, in response to the decrease in the inter-roller center distance L1, the inter-roller radial depressing force (inter-roller transmission torque capacity; traction transmission capacity) may be variably controlled to freely adjust the drive force distribution ratio (i.e., the ratio of torque going to front and back wheels).

As shown in FIG. 4A, in the present embodiment, the inter-roller center distance L1 in a state of bottom dead center (in which the rotation shaft axis O2 is located directly below the rotation axis O3 of crankshaft and the inter-roller distance between first roller 31 and second roller 32 becomes maximum) is configured to be larger than the sum of the radius of first roller 31 and the radius of the second roller 32. Thus, at the bottom dead center configuration with crankshaft rotation angle=0°, the first roller 31 and the second roller 32 are prevented from being pressed against each other in the radial direction. In this configuration, no traction transmission occurs between rollers 31, 32 takes place (i.e., traction transmission capacity=0). Therefore, traction capacity may be continuously set to a value anywhere between θ=0° at the bottom dead center and the maximum value obtainable at the top dead center as shown in FIG. 4C (i.e., θ=180°). In the present embodiment, a rotation angle reference of crankshaft 51L, 51R, at the bottom dead center (i.e., crankshaft rotation angle θ=0°) is set.

Operation of Drive Force Distribution Apparatus

With reference to FIGS. 1 to 4, the operation of the drive force distribution apparatus is now described. An output torque from the transmission 3 (shown in FIG. 1) is imparted to input shaft 12 of drive force distribution apparatus 1. The torque can be further transmitted directly from the input shaft 12 to the left 6L and right 6R rear wheels (main drive wheels) through the rear propeller shaft 4 and the rear final drive unit 5 (both being shown in FIG. 1).

When the inter-roller distance L1 (shown in FIG. 4) is set less than the sum of the radius of first roller 31 and the radius of second roller 32 in response to the rotation position control of crankshafts 51L, 51R, by motor 35 through pinion 55 and ring gears 51Lc, 51Rc, the drive force distribution transfer apparatus 1 acquires an inter-roller transmission torque capacity in accordance with the radial pressing force between first roller 31 and second roller 32. Depending on this torque capacity, drive force distribution apparatus 1 can divert a portion of the torque from the left and right rear wheels 6L and 6R (main drive wheels) toward the output shaft 13 (FIG. 2) by passing torque from the first roller 31 to the second roller 32. A torque reaching the output shaft 13 is therefore transmitted to drive the left 9L and right 9R front wheels (subordinate drive wheels). The vehicle can therefore be operated in a four-wheel drive mode in which the left 6L and right 6R rear wheels (main drive wheels) and the left 9L and right 9R front wheels (subordinate drive wheels) are driven.

The traction drive system described above conveys the force in the tangential direction (direction of roller rotation) due to the shear stress of a working fluid that is confined in the elastically deformable contact portion produced by radially pressing a pair of smooth roller elements (i.e. first roller 31 and second roller 32). Thus, it is preferable to use a hydraulic fluid with a large limit shear stress (e.g., naphthenic oil).

During travel in the four-wheel drive mode, when the rotation angle θ of crankshaft 51L, 51R is set at a reference position of θ=90° (FIG. 4B), the first roller 31 and second roller 32 are pressed against each other for frictional contact at a radial pressing force corresponding to an offset amount OS. As such, the amount of torque transmission given to left 9L and right 9R front wheels (subordinate drive wheels) occurs in accordance with the offset value OS between the two rollers.

As the rotation angle θ of crankshaft 51L, 51R, increases from the reference position shown in FIG. 4B toward the top dead center (θ=180°) as shown in FIG. 4C, the inter-roller center distance L1 further decreases to increase the overlap amount OL between first roller 31 and second roller 32.

Consequently the radial pressing force between first roller 31 and second roller 32 will be increased to thereby increase the traction transmission capacity between these rollers. When crankshafts 51L, 51R, have reached the position of top dead center (θ=180°, FIG. 4C), first roller 31 and second roller 32 are pressed at the maximum radial pressing force corresponding to the maximum overlap amount OL. As such, the traction transmission capacity between the two is maximized. The maximum overlap amount OL is obtained by adding the eccentric amount ϵ0 between the second roller rotation axis O2 and crankshaft rotation axis O3 to the offset amount OS described with reference to FIG. 4B.

As will be appreciated from the description above, by operating crankshafts 51L, 51R, to rotate from the position of θ=0° to the position of θ=180°, an inter-roller traction transmission capacity may be varied continuously from the minimum (i.e., zero) to the maximum. Conversely, by operating crankshafts 51L, 51R to rotate from the position of θ=180° to the position of θ=0°, the inter-roller traction transmission capacity may be varied continuously from its maximum to its minimum (i.e. zero). Thus, the inter-roller traction transmission capacity may be controlled freely by the rotational operation of crankshafts 51L, 51R.

Control of Traction Transmission Capacity

During four-wheel drive operation (described above), drive force distribution apparatus 1 outputs and conveys a part of the torque to left 6L and right 6R rear wheels (main drive wheels) to left 9L and right 9R front wheels (subordinate drive wheels). Thus, the traction transmission capacity between the first roller 31 and the second roller 32 is required to correspond to a target front wheel drive force to be distributed to left and right front wheels (subordinate wheels) that is obtainable based on the drive force to left and right rear wheels (main drive wheels) 6L, 6R and the distribution ratio of front to rear wheel target drive force. In the present embodiment, in order to perform a required traction transmission capacity control, a transfer controller 111 is provided shown in FIG. 1 to perform control of the rotational position (control of rotation angel θ of crankshaft) of motor 35.

Therefore, transfer controller 111 receives a signal from accelerator pedal opening sensor 112 to detect the accelerator depressing amount (accelerator pedal opening degree) APO to adjust the output of engine 2, a signal from rear wheel speed sensor 113 to detect the rotational peripheral speed Vwr of left and right rear wheels 6L, 6R (main drive wheels), a signal of yaw-rate sensor 114 to detect a yaw-rate φ about the vertical axis passing through the center of gravity of the vehicle, a signal from the crankshaft rotation angle sensor 115 to detect the rotation angle θ of crankshaft 51L, 51R, and a signal of an oil temperature sensor 116 to detect a temperature TEMP of working oil within the transfer 1 (housing 11).

Based on the input information of each sensor described above, transfer controller 111 controls the traction transmission capacity (front to rear wheel drive force distribution control of four wheel drive vehicle) in the following manner.

Specifically, transfer controller 111 first determines both a drive force of left and right wheels 6L, 6R (main drive wheels) and the front to rear target drive force distribution ratio.

Subsequently, transfer controller 111 determines a target front wheel drive force to be conveyed to left 9L and right 9R front wheels (subordinate wheels) based on the drive force of left 6L and right 6R rear wheels (main drive wheels) and the target distribution ratio between front and rear drive force.

Further, transfer controller 111 determines a target radial inter-roller pressing force (traction transmission capacity) imparted by first roller 31 and second roller 32 necessary to transmit the target front drive force, and then determines a target rotation angle $θ_t$ of crankshaft 51L, 51R (see FIGS. 2, 3), which is, target rotation angle of second roller axis O2 so as to achieve the target radial inter-roller pressing force (traction transmission capacity between first roller 31 and second roller 32).

Then, transfer controller 111 instructs the inter-roller pressing force control motor 35 to adjust crankshaft rotation angle θ so as to match the target crankshaft rotation angle $θ_t$ in accordance with the difference between the crankshaft rotation angle θ detected by sensor 115 and the target crankshaft rotation angle $θ_t$. When the rotation angle θ of crankshaft 51L, 51R, matches the target value $θ_t$, the first roller 31 and the second roller 32 are pressed against each other so as to transmit the target front wheel drive force. In this way, the first roller 31 and second roller 32 may be controlled to adjust the traction transmission capacity to match the target front to rear wheel drive force distribution.

Detection of Rotation Angle θ

The crankshaft rotation angle θ (rotation of crankshaft 51L, 51R) detected by the crankshaft rotation angle sensor 115 merely represents a relative value. Thus, in order to detect an absolute value of crankshaft rotation angle θ, it is necessary to set a reference position and to convert the detection value of the crankshaft rotation angle sensor 115 to give the rotational amount or rotation angle with respect to the reference position. In this respect, in the present embodiment, a structural body 510 (FIG. 5) is provided to suppress the turn of the second roller 32 further than a predetermined position. In addition, the transfer controller 111 turns the second roller 32 in one direction and detect the position of suppression (crankshaft rotation angle θ) so as to set the detected position as a reference position (θ=0°).

Figure 5:
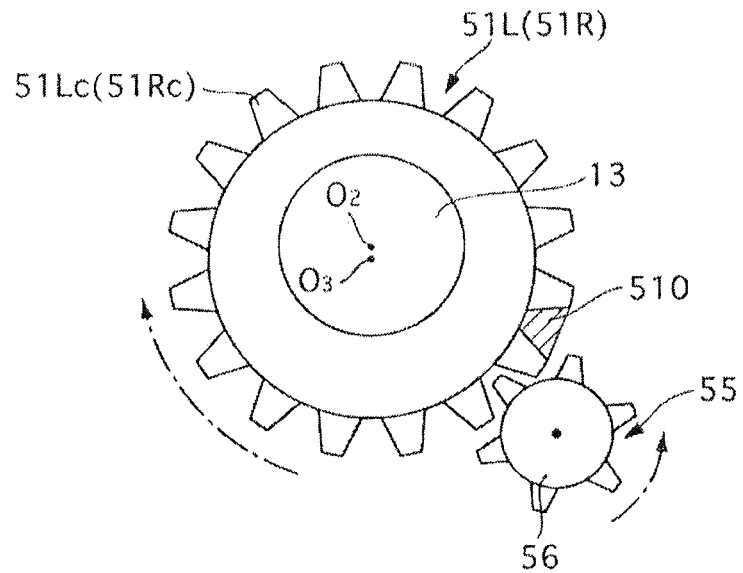
FIG. 5 is an axial front schematic view of a crankshaft illustrating the structural body, according to an embodiment.

FIG. 5 is a front diagram of crankshaft 51L (51R) as viewed in the axial direction, illustrating output shaft 13, ring gear 51Lc (51Rc), and crankshaft drive pinion 55 in meshed relationship therewith. The structural body is formed by inserting a filler into a part of teeth of ring gear 51Lc (51Rc) of crankshaft 51L (51R). In an embodiment, the filling may be fixed by welding. Either the teeth of ring gear 51Lc or the teeth of ring gear 51Rc may be filled.

The reference position may be set by the manufacturer or at a later time after the vehicle has been driven a predetermined distance. The structural body 510 may be positioned so that when crankshafts 51L, 51R are positioned at top dead center (TDC) no further rotation is permitted.

The reference position setting unit 117 determines that structural body 510 is in a position to suppress the turn of the second roller 32 upon detecting that crankshafts 51L, 51R, have stopped based on the detection value of crankshaft rotation sensor 115. Alternatively, when a current value to be supplied to motor 35 is automatically set in accordance with a rotation resistance to achieve a predetermined rotation angle of motor 35 (rotation amount of crankshafts 51L, 51R), it may be determined as well that the structural body 510 has suppressed the turn of the second roller 32 upon detection of the increase in that current value (for example, upon the command current value exceeding a preset threshold).

Subsequently, the stopped position of crankshafts 51L, 51R, is stored and set as a reference position. Stated another way, the crankshaft rotation angle θ at the reference point or position is set (θ=0°). The detection value of the crankshaft rotation angle sensor 115 is calculated with reference to the output value of crankshaft rotation angle sensor 115 at the stored reference position (θ=0°). Thus the detection value is converted to an absolute crankshaft rotation angle θ. The transfer controller, in turn, executes a drive force distributing control based on this (absolute) crankshaft rotation angle θ (equivalent to the turning amount of the second roller 32).

Effects of the First Embodiment

According to the present embodiment, as the second roller 32 is turned in one direction, the angular position at which this turning is stopped by structural body 510 is set as a reference position. The drive force distribution control is then performed based on the turning amount of the second roller 32 detected relative to this reference position. Therefore, in setting a reference position of the turning amount of second roller 32, it is not necessary for the second roller 32 to be turned in both directions. This facilitates a quick detection of the turning amount of the second roller 32 and therefore improves the responsiveness in drive force distribution control as it relates to the radial inter-roller pressing force control.

The above described embodiment stands in contrast to the conventional technique (described in U.S. Patent Application Publication No. 2012/0100955 A1) in which, in order to set a crankshaft rotation angle reference point, the second roller has to be turned in two directions such that it takes time to detect an absolute value of crankshaft rotation angle (or a reference position setting therefore). Further, in the conventional technique, the torque for driving the crankshaft for setting a reference position (torque of motor/actuator) is taken to be the value at which the second roller stops to turn upon start of contact of the periphery of the second roller with the periphery of first roller (i.e., the minimum required torque). Thus, a relatively long time would be required when using this minimum required torque and actuating the crankshaft to rotate in both directions according to the conventional approach. Therefore, the response of the driving force distribution control via pressing force control in the radial direction, according to the conventional approach, is not optimal.

In contrast, according to the present embodiment, there is no need to rotate the crankshafts 51L, 51R, in both directions to set a reference position of crankshaft rotation angle θ, but rather, it suffices to drive only in one direction. In addition, in the present embodiment, a larger torque value may be used for setting a reference point (i.e., one that is greater than is required to stop second roller 32 upon contact on the outer periphery 31a of the first roller 31). In this way, the torque value exceeds the one used in the conventional technique. Therefore, a shorter time is necessary for driving the crankshafts 51L, 51R for setting the reference position. Therefore, the responsiveness in the drive force distribution control is increased relative to that of the conventional approach.

The friction of bearings supporting crankshaft or second roller (output shaft) depends on the oil temperature and age of the components. Thus, the relationship between the torque for driving the crankshaft and the radial inter-roller pressing force (frictional contact force) depends on these factors. In the conventional technique, an accurate adjustment of torque (motor current) or accurate detection of start of contact between two rollers based on motor current is difficult to set. Such conventional techniques require that the second roller stops to turn when the outer periphery of second roller begins to contact the outer periphery of the first roller causing the crankshaft to stop rotating. In the conventional technique these variations may be overcome to some extent by setting a central position between the stopped positions of the second roller in both directions. However, in the conventional configurations, time is required to set a reference position of the crankshaft rotation angle θ and there is a limit on the ability to accurately set the reference position due to the effects mentioned above.

In contrast, according to the drive force distribution apparatus 1 of the present embodiment, the position at which turning of second roller 32, is stopped by structural body 510 is mechanically determined and is not affected by changes in friction of the roller bearings 52, 53 etc., resulting from changes in oil temperature or aging. Therefore, the accuracy in drive force distribution control is increased. In addition, since there is no need to drive crankshafts 51L, 51R, in both directions to offset such effects as in the case of conventional technique, the time required for setting the reference position is shortened.

The angular position at which the second roller 32 stops turning is not necessarily at the top dead center, but may be chosen to be at bottom dead center also.

Irrespective of which position is set as the reference position, the beneficial effects described above may be achieved. In the present embodiment, since the structural body 510 is provided so as to stop rotation of the second roller 32 at the position (top dead center) at which the radial inter-roller pressing force represents the maximum, any angular position between bottom dead center and top dead center is possible and is not blocked by the structural body 510. Stated another way, turning of second roller 32 may be stopped at top dead center not only in response to a turn in the direction indicated by arrow in FIG. 5 but also in response to a turn in the opposite direction. Therefore, since the control range (upper limit) will not be restricted depending on the direction of turn (direction of rotation of crankshaft 51L, 51R) from the initial turning position, the control width or controllability of traction transmission capacity is improved.

Further, overshoot beyond the top dead center position (i.e. over-turning of second roller 32 excessively beyond the top dead center during the drive control of the motor 35) is prevented. The accuracy in the traction transmission capacity control is therefore improved. Indeed, when the target crankshaft rotation angle $\theta_t$ is near the top dead center, the torque to drive the crankshaft 51L, 51R will be large, and the likelihood of overshoot is larger. By stopping the turning of second roller 32 at the top dead center by the structural body 510, (even if current of motor 35 would have overshot) the situation of over-turn beyond the top dead center will be prevented. Thus the accuracy in the radial inter-roller pressing force in the vicinity of the top dead center (torque transmission capacity) is improved. Also, since no radial inter-roller pressing force is generated at the bottom dead center, the problem of control accuracy (related to overshot) does not arise.

Crankshafts 51L, 51R, are provided as a roller turning drive member to turn the second roller 32. Crankshafts 51L, 51R, are provided with ring gears 51Lc, 51Rc, in meshed relationship with teeth (pinion 55) formed on the drive shaft (pinion shaft 56) rotatably driven by motor 35 and are disposed rotatably in housing 11. A second roller 32 is rotatably supported at the location eccentrically located from the axis of rotation of crankshafts 51L, 51R (center axis O3). The structural body 510 is formed by filling a part of teeth of ring gears 51Lc, 51Rc. Thus through a simple structure formed by only filling a part of the teeth of existing ring gears 51Lc, 51Rc, originally provided to drive the roller to rotate, the structural body 510 for setting reference position provides a simple, compact, cost effective solution.

Second Embodiment

In a second embodiment, a drive force distributing apparatus is provided that has a different configuration from that of the first embodiment with regard to the structure 510. The structural body 510 is provided with both a first protrusion portion 511 (FIG. 6) formed at the outer periphery of crankshaft 51R and a second protrusion portion 512 (FIG. 7) formed in the inner periphery of housing 11 opposing the outer periphery of the crankshaft 51R such that the rotation of crankshaft 51R may be suppressed by engagement between the first protrusion portion 511 and the second protrusion portion 512.

Figure 6:
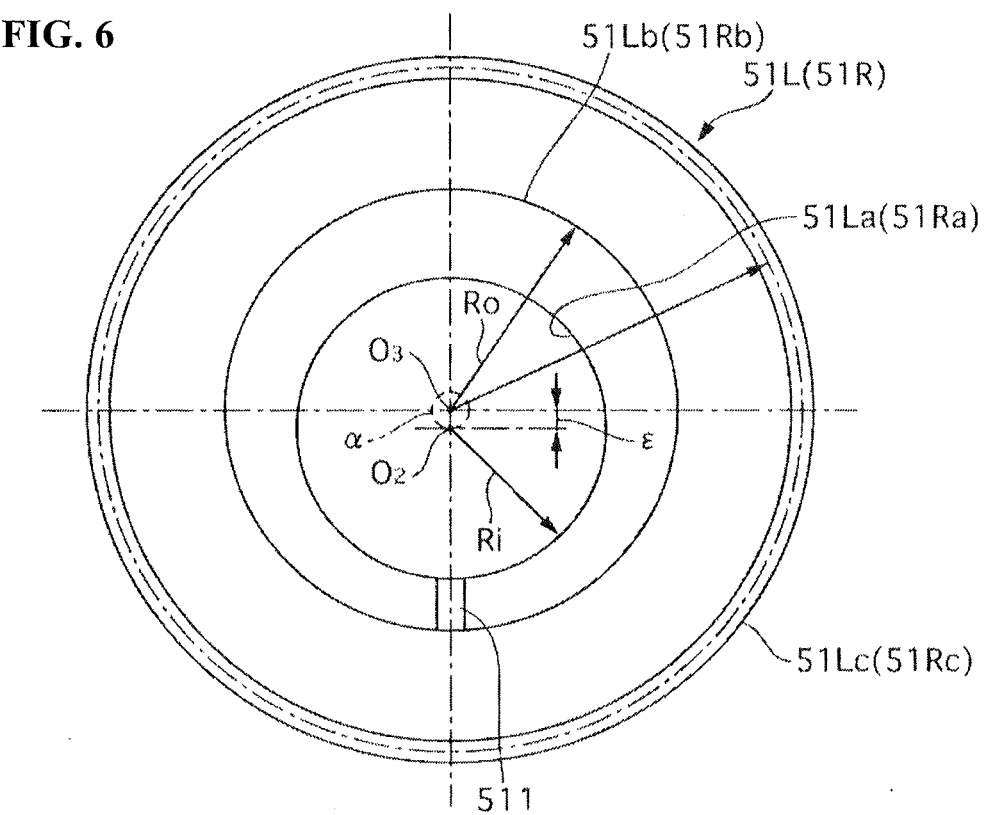
FIG. 6 is an axial front view of crankshaft illustrating the structural body, according to a second embodiment.
Figure 7:
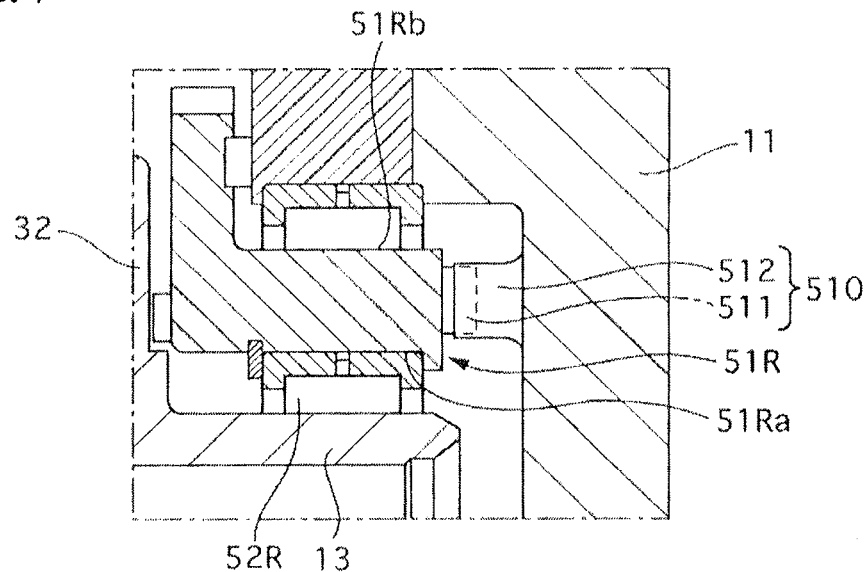
FIG. 7 is a partially exploded vertical cross-sectional diagram of the drive force distributing apparatus illustrating the structural body, according to a second embodiment.

FIG. 6 is an axial front view of a crankshaft 51R according to the second embodiment. The axial end face of the crankshaft 51R opposing or facing the inner periphery of the housing 11 is provided with a first protrusion 511. FIG. 7 shows a portion where the axial end surface of the crank shaft 51R is opposed to the inner periphery of the housing 11 in the vertical cross sectional view of the drive force distributing apparatus according to the second embodiment. The inner periphery of the housing 11 facing the axial end surface of the outer periphery of the crankshaft 51R is provided with a second protrusion 512. When crankshafts 51L, 51R (first protruding part 511) are rotated from the bottom dead center position (FIG. 6) to near the top dead center, the first protrusion 511 contacts with the second protrusion portion 512, and as shown by the broken lines in FIG. 7. At this position, further rotation of crankshafts 51L, 51R is restricted.

Problems associated with the first embodiment may be avoided with the second embodiment. With the first embodiment there is a possibility that the entire tooth of crankshaft 51R may be deformed. This may lead to generation of noise in the meshing portion of the teeth. In contrast, according to the present second embodiment, no risk of deformation of overall teeth of crankshaft 51L, 51R is encountered so that these problems may be avoided.

With respect to the location at which the first protrusion 511 is formed on the crankshaft 51R, there is no limitation to the axial end face. Further, the first protrusion may be provided in either outer periphery of the first and second crankshafts 51L, 51R.

Third Embodiment

Figure 9:
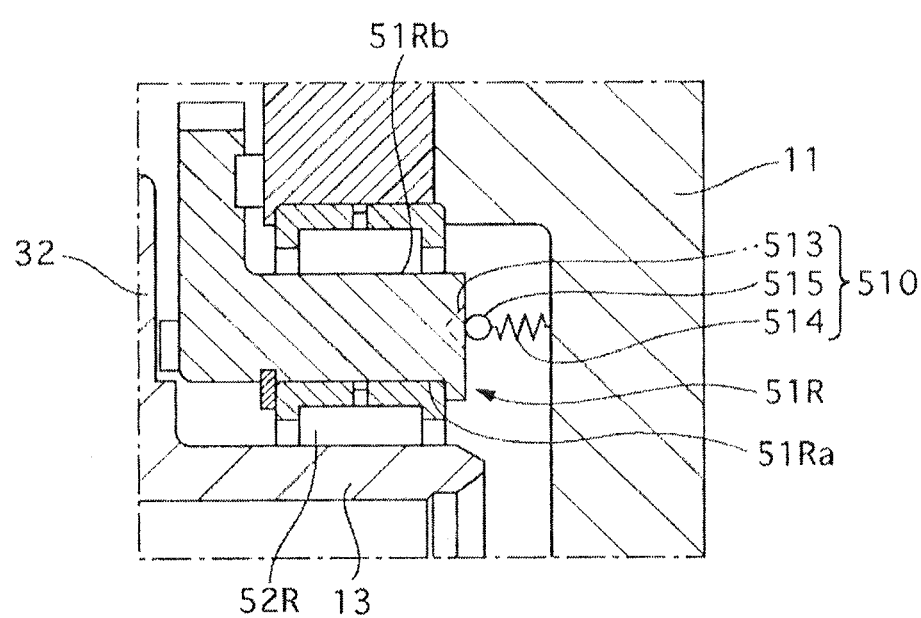
FIG. 9 is a partially exploded vertical cross-sectional diagram of the drive force distributing apparatus illustrating the structural body, according to the third embodiment.

According to a third embodiment, the drive force distributing apparatus is different from the first and second embodiments as it relates to the structural body 510. In this embodiment, as illustrated in FIG. 9, the structural body 510 includes a recess portion 513 formed on the outer periphery of crankshaft 51R, an elastic member (compression coil spring 514) disposed in the inner periphery of housing facing the outer periphery of crankshaft 51R, and a member with curved shape (ball 515) provided on the tip of the elastic member such that the rotation of crankshaft 51R may be suppressed by engagement of the spherical member with the recess 512.

Figure 8:
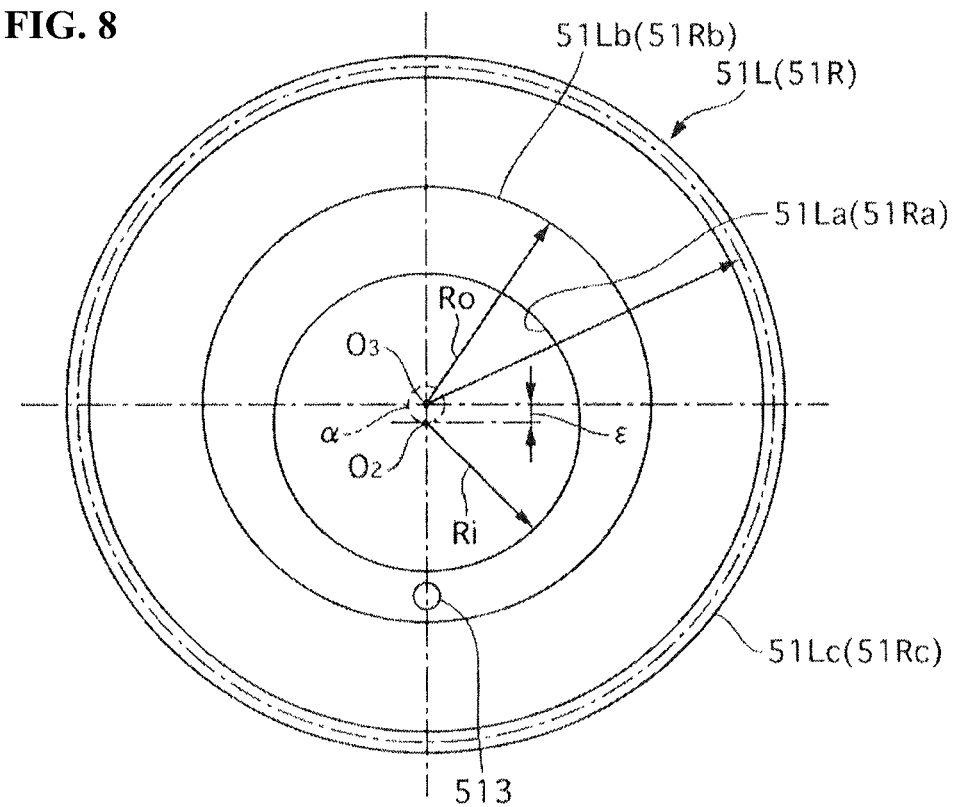
FIG. 8 is an axial front view of crankshaft illustrating a structural body, according to a third embodiment.

FIG. 8 is an axial front view showing the crank shaft 51R according to the third embodiment. At the axial end face of crankshaft 51R, the inner periphery of housing 11 is provided with a recess 513. FIG. 9 illustrates a portion where the axial end surface of the crank shaft 51R is opposed to the inner periphery of the housing 11 in the vertical cross sectional view of the drive force distributing apparatus. The inner periphery of the housing 11 facing the axial end surface of the outer periphery of the crankshaft 51R is provided with a compression coil spring 514 as the elastic member and a ball 515 as a curved body positioned at the tip of the compression coil spring 514. The compression coil spring 514 continuously urges the ball toward the axial end surface of crankshaft 51R. When the crankshaft 51L, 51R (recess portion 513) rotates from the bottom dead center shown in FIG. 8 to reach the top dead center, the ball 515 engages with the recess 513 (shown by dotted line in FIG. 9) such that further rotation of the crankshafts 51L, 51R is restricted. In other words, structural body 510-514 suppresses the turning movement of second roller 32.

According to the third embodiment, it is possible for ball 515 to come out of the recess 513 as a result of the curved shape of ball 515 in response to compression of the compression coil spring 514. This can occur when, after ball 515 has been engaged with the recess, the current value to be supplied to motor 35 (i.e. torque of motor 35) is increased above a certain magnitude. Thus, instead of complete suppression of rotation of crankshafts 51L, 51R, by a structural body, the turning position of the second roller 32 may be restricted through a range of angular positions near the top dead center position. In this way, the width of traction transmission capacity control as well as controllability is improved. The curved member need not be limited to ball 515, but a pin may also be employed. Further, an elastic member other than a compression coil spring may be used. Also, the recess portion 513 may be of arbitrary shape such as hole or groove.

In contrast to the first embodiment, according to the third embodiment there is no risk of deformation of overall teeth of crankshaft 51L, 51R so that problems associated with noise (discussed above) may be avoided.

Further, in contrast to the first and second embodiments, in the third embodiment, second roller 32 may be rotated preciously up to the top dead center in both directions with no angular range excluded. Therefore, the reference position may be set at the precise top dead center so that the control range of torque transmission capacity may be maximized to improve both the width of traction transmission capacity control and controllability.

The portion at which the recess portion 513 is formed in the crankshaft 51R is not limited to the axial end. Further, the recess portion may be formed on either outer periphery of the crankshafts 51L, 51R.

Other Embodiments

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having," and their derivatives. Also, the terms "part," "section," "portion," "member," or "element," when used in the singular can have the dual meaning of a single part or a plurality of parts. Also as used herein to describe the above embodiments, the following directional terms "forward," "rearward," "above," "downward," "vertical," "horizontal," "below" and "transverse" as well as any other similar directional terms refer to those directions of a device equipped with the present invention. Accordingly, these terms, as utilized to describe the present invention should be interpreted relative to a device equipped with the present invention. The term "detect" as used herein to describe an operation or function performed by a component, a section, a device or the like includes a component, a section, a device or the like that does not require physical detection, but rather includes determining, measuring, modeling, predicting or computing or the like to perform the operation or function. The term "configured" as used herein to describe a component, section or part of a device includes hardware and/or software that is constructed and/or programmed to perform the desired function. Moreover, terms of degree such as "substantially," "about," and "approximately," as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

For example, in respective embodiments, the second roller 32 is turned by rotation of crankshafts 51L, 51R. However, such a crankshaft may be provided to turn the first roller 31, and, the radial inter-roller pressing force may be adjusted due to turning of the first roller 31.

For example, in each embodiment, hollow outer-shaft type of crankshafts 51L, 51R are employed as the driving member for turning the second roller 32. However, other types of driving member may also be employed.

For example, in each embodiment, turning of the second member 32 is suppressed at the predetermined position by restricting the rotation of crankshafts 51L, 51R, by the structural member 510. However, the turning of second roller 32 may be directly restricted by a structural member provided to the output shaft 13 and the like.

What is claimed is:

1. A drive force distributing apparatus including a first roller rotatable jointly with a main drive wheel system and a second roller rotatable jointly with a subordinate drive wheel system in which a drive force distribution to the subordinate drive wheel system is enabled by pressing the first roller and the second roller against each other in a drive force transmittable way, wherein control of the drive force distribution between the main drive wheel system and the subordinate drive wheel system is performed by turning one of the first and second rollers to thereby adjust a radial pressing force of the first and second rollers, the drive force distribution apparatus comprising:
   a structural body that suppresses turning of the one of the first and second rollers at a predetermined position; and
   a reference position setting mechanism that turns one of the first and second rollers in one direction, detects a position at which the turn is suppressed by the structural body, and sets a reference position based on the detected position,
   wherein a turning amount of the one of the first and second rollers is detected with respect to the reference position set by the reference position setting mechanism and the control of drive force distributing is performed based on the detected turning amount.

2. The drive force distributing apparatus as claimed in claim 1, wherein the one of first and second rollers is configured to be suppressed from turning at a position at which the radial inter-roller pressing force becomes maximum.

3. The drive force distributing apparatus as claimed in claim 2, further comprising:
   a roller turning drive member that turns the one of first and second rollers,
   wherein the roller turning drive member is disposed rotatably in a housing of the drive force distributing apparatus, and supports the roller to be turned rotatably about a location eccentric to the center of rotation of the roller turning drive member, and
   wherein the structural body is provided with a first protruding portion formed in the outer periphery of the roller turning drive member and a second protruding portion formed in the inner periphery of the housing facing the outer periphery of the roller turning drive member,
   wherein the rotation of the roller turning drive member is restricted by engagement between the first and second protruding portions.

4. The drive force distributing apparatus as claimed in claim 2, further comprising:
   a roller turning drive member that turns the one of first and second rollers,
   wherein the roller turning drive member is provided with gear meshed teeth formed on a drive shaft rotatably driven by an actuator and is disposed rotatably in a housing of the drive force distributing apparatus, and supports the roller to be turned rotatably about a location eccentric to the center of rotation of the roller turning drive member, and
   wherein the structural body is formed by filling a part of the teeth.

5. The drive force distributing apparatus as claimed in claim 2, further comprising:
   a roller turning drive member that turns the one of first and second rollers,
   wherein the roller turning drive member is disposed rotatably in a housing of the drive force distributing apparatus, and supports the roller to be turned rotatably about a location eccentric to the center of rotation of the roller turning drive member, and
   wherein the structural body is provided with a recess portion formed in the outer periphery of the roller turning drive member, an elastic member disposed in the inner periphery of the housing facing the outer periphery of the roller turning drive member, and a member with a curved surface disposed at the tip of the elastic member,
   wherein the rotation of the roller turning drive member is configured to be restricted through engagement of the member with curved surface in the recess portion.

6. The drive force distributing apparatus as claimed in claim 1, further comprising:
  a roller turning drive member that turns the one of first and second rollers,
  wherein the roller turning drive member is provided with gear meshed teeth formed on a drive shaft rotatably driven by an actuator and is disposed rotatably in a housing of the drive force distributing apparatus, and supports the roller to be turned rotatably about a location eccentric to the center of rotation of the roller turning drive member, and
  wherein the structural body is formed by filling a part of the teeth.

7. The drive force distributing apparatus as claimed in claim 1, further comprising:
  a roller turning drive member that turns the one of first and second rollers,
  wherein the roller turning drive member is disposed rotatably in a housing of the drive force distributing apparatus, and supports the roller to be turned rotatably about a location eccentric to the center of rotation of the roller turning drive member, and
  wherein the structural body is provided with a recess portion formed in the outer periphery of the roller turning drive member, an elastic member disposed in the inner periphery of the housing facing the outer periphery of the roller turning drive member, and a member with a curved surface disposed at the tip of the elastic member,
  wherein the rotation of the roller turning drive member is configured to be restricted through engagement of the member with curved surface in the recess portion.

8. The drive force distributing apparatus as claimed in claim 1, further comprising:
  a roller turning drive member that turns the one of first and second rollers,
  wherein the roller turning drive member is disposed rotatably in a housing of the drive force distributing apparatus, and supports the roller to be turned rotatably about a location eccentric to the center of rotation of the roller turning drive member, and
  wherein the structural body is provided with a first protruding portion formed in the outer periphery of the roller turning drive member and a second protruding portion formed in the inner periphery of the housing facing the outer periphery of the roller turning drive member,
  wherein the rotation of the roller turning drive member is restricted by engagement between the first and second protruding portions.

\* \* \* \* \*